United States Patent [19]

Asanuma et al.

[11] Patent Number: 5,314,957
[45] Date of Patent: May 24, 1994

[54] MOLDED ARTICLE OF CROSSLINKED POLYOLEFIN AND METHOD FOR PREPARING IT

[75] Inventors: Tadashi Asanuma, Yokohama; Kazuhiko Yamamoto, Takaishi, both of Japan

[73] Assignee: Mitsui Toatsu Chemicals, Inc., Tokyo, Japan

[21] Appl. No.: 992,101

[22] Filed: Dec. 17, 1992

[30] Foreign Application Priority Data

| Dec. 25, 1991 | [JP] | Japan | 343126 |
| Feb. 13, 1992 | [JP] | Japan | 026470 |
| Mar. 12, 1992 | [JP] | Japan | 053185 |
| Mar. 31, 1992 | [JP] | Japan | 076569 |

[51] Int. Cl.$^5$ ................................. C08F 8/00
[52] U.S. Cl. ........................... 515/245; 524/534; 524/535; 525/247; 525/288
[58] Field of Search ............... 525/245, 247, 288; 524/534, 535

[56] References Cited

U.S. PATENT DOCUMENTS

| 3,699,186 | 10/1972 | Schrage et al. | 525/288 |
| 4,707,520 | 11/1987 | Keogh | 525/245 |
| 4,753,993 | 6/1988 | Keogh | 525/288 |
| 4,977,210 | 12/1990 | Kerth et al. | 525/247 |
| 5,112,918 | 5/1992 | Boocock et al. | 525/288 |

FOREIGN PATENT DOCUMENTS 58-117244  7/1983  Japan .

OTHER PUBLICATIONS

Database WPIL, Derwent Publications Ltd., AN 91-175181, May 7, 1991.
Database WPIL, Derwent Publications Ltd., AN 90-182612, May 8, 1990.
Database WPIL, Derwent Publications Ltd., AN 85-279243, Mar., 1984.
Chemical Abstracts, vol. 84, No. 2, Jan. 12, 1976 & JP A 75-91662.
Database WPIL, Derwent Publications Ltd., AN 91-048155, Jan. 7, 1991.

*Primary Examiner*—Bernard Lipman
*Attorney, Agent, or Firm*—Burns, Doane, Swecker & Mathis

[57] ABSTRACT

A method for preparing a molded article of a crosslinked polyolefin which comprises the steps of bringing a composition comprising a copolymer of an alkenylsilane and an olefin and a compound having at least two unsaturated bonds into contact with a catalyst selected from the group consisting of salts of rhodium, alkoxy compounds and metallocene compounds of metals in the group IVa of the periodic table, combinations of the metallocene compounds and organic metal compounds, and then molding the composition, or carrying out the contact simultaneously with the molding, or molding the composition, and then bringing the molded article into contact with the catalyst, and if necessary, further heating the molded article to accelerate a crosslinking reaction.

The molded article of the crosslinked polyolefin obtained by the method of the present invention has a high crosslinking density and is excellent in mechanical properties, solvent resistance and heat resistance.

16 Claims, No Drawings

MOLDED ARTICLE OF CROSSLINKED POLYOLEFIN AND METHOD FOR PREPARING IT

BACKGROUND OF THE INVENTION (i) Field of the Invention

The present invention relates to a method for preparing a molded article of a crosslinked polyolefin and the molded article More specifically, it relates to a method for preparing a molded article of a crosslinked polyolefin which comprises treating a mixture of a specific copolymer and a specific unsaturated compound with a catalyst, and the molded article.

(ii) Description of the Prior Art

For the purpose of improving mechanical properties, solvent resistance and heat resistance of molded articles of a polyolefin, it has been widely known to crosslink the polyolefin. Various techniques for crosslinking have already been suggested, and there have been known a method which comprises mixing a bifunctional monomer and a radical generator with a polyolefin, followed by heating and melting to achieve crosslinking; a method which comprises copolymerizing a monomer having a hydrolyzable group such as a alkoxysilane with an olefin to form a copolymer, molding it and then treating the molded copolymer with boiling water to perform a hydrolytic reaction, thereby forming an Si—O—Si bond, whereby crosslinking is achieved (Japanese Patent Application Laid-open No. 58-117244); and a method which comprises irradiating a molded article of a polyolefin with radiation to achieve crosslinking. In addition, there is also a method suggested by the present inventors which comprises copolymerizing an alkenylsilane with an olefin, and then treating the resultant copolymer with a catalyst to form an Si-C bond and to thereby achieve crosslinking (Japanese Patent Application Laid-open No. 3-106951).

These suggested methods can provide a crosslinked polyolefin, but its crosslinking density is not considered to be sufficiently high. Even when the crosslinking density is low, the heat resistance of molded articles obtained therefrom can be fairly improved, but in order to utilize the crosslinked molded articles as structures or in order to improve solvent resistance at high temperatures, it is desired to further increase the crosslinking density.

SUMMARY OF THE INVENTION

The present inventors have intensively investigated a technique for increases crosslinking density with ease so as to solve the above-mentioned problems, and the present invention has now been completed.

That is, the present invention is directed to a method for preparing a molded article of a crosslinked polyolefin which comprises the steps of bringing a composition comprising a copolymer of an alkenylsilane and an olefin and a compound having at least two unsaturated bonds into contact with a catalyst selected from the group consisting of salts of rhodium, alkoxy compounds and metallocene compounds of metals in the group IV of the periodic table, and combinations of the metallocene compounds and organic metal compounds, and then molding the composition, or carrying out the contact simultaneously with the molding, or molding the composition, and then bringing the molded article into contact with the catalyst, and if necessary, further heating the molded articles to accelerate a crosslinking reaction. In addition, the present invention relates also to a molded article of a crosslinked polyolefin obtained by the above-mentioned method.

The molded articles of the crosslinked polyolefin obtained by the method of the present invention have a high crosslinking density and are excellent in mechanical properties, solvent resistance and heat resistance.

DETAILED DESCRIPTION OF THE INVENTION

In the present invention, an alkenylsilane having at least one Si—H bond is preferably used, and examples of the alkenylsilane include compounds represented by the formula $$H_2C=CH-(CH_2)_n-SiH_pR_{3-p} \quad (1)$$

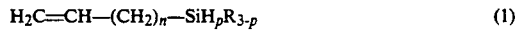

(wherein n is an integer from 0 to 12; p is an integer from 1 to 3; and R is a hydrocarbon residue having 1 to 12 carbon atoms). Typical examples of the alkenylsilane include vinylsilane, allylsilane, butenylsilane, pentenylsilane and compounds in which each H of partial Si—H bonds of these monomers is replaced with chlorine.

Examples of the olefin include compounds represented by the formula $$H_2C=CH-R \quad (2)$$

(wherein R is hydrogen or a hydrocarbon residue having 1 to 12 carbon atoms), and typical examples of the olefin include α-olefins such as ethylene, propylene, butene-1, pentene-1, hexene-1, 2-methylpentene, heptene-1 and octene-1 as well as styrene and its derivatives.

In the present invention, a copolymer of an olefin and an alkenysilane can be prepared by a solvent method using an inert solvent, a mass polymerization method or a gaseous phase polymerization method. A catalyst which is usually used in the preparation comprises a transition metal compound and an organic metal compound, and the transition metal compound is preferably a titanium halide and the organic metal compound is preferably an organic aluminum compound.

Typical examples of the catalyst include a catalyst system comprising titanium trichloride modified with an electron-donating compound, an organic aluminum compound and if necessary, an electron-donating compound such as an oxygen-containing organic compound, this titanium trichloride being obtained by reducing titanium tetrachloride with metal aluminum, hydrogen or organic aluminum; a catalyst system comprising a transition metal compound catalyst, an organic aluminum compound and if necessary, an electron-donating compound such as an oxygen-containing organic compound, this transition metal compound catalyst being obtained by carrying a titanium halide on a carrier such as a magnesium halide which may be treated with an electron-donating compound; and a catalyst system comprising a transition metal compound catalyst, an organic aluminum compound and if necessary, an electron-donating compound such as an oxygen-containing organic compound, the abovementioned transition metal compound catalyst being obtained by dissolving a reaction product of magnesium chloride and an alcohol in a hydrocarbon solvent, treating the solution with a precipitant such as titanium tetrachloride to make the material insoluble in the hydrocarbon solvent, if necessary, treating the material with an electron-donating compound such as an ester or ether, and then treating the material with a titanium halide [e.g., various examples of the catalyst systems are described in the following literature: Ziegler-Natta Catalysts and Polymerization by John Boor Jr. (Academic Press), Journal of Macromolecular Science Reviews in Macromolecular Chemistry and Physics, C24(3) pp. 355–385 (1984), the same C25(1), pp. 578–597 (1985)]. Alternatively, there can also be used a catalyst comprising a transition metal catalyst soluble in a hydrocarbon solvent and an aluminoxane.

Preferable examples of the electron-donating compound usually include oxygen-containing compounds such as ethers, esters, orthoesters and alkoxysilicon compounds, and alcohols, aldehydes and water are also usable as the electron-donating compound.

Examples of the organic aluminum compound include a trialkylaluminum, dialkylaluminum halide, alkylaluminum sesquihalide and alkylaluminum dihalide, and examples of the alkyl group include a methyl group, ethyl group, propyl group, butyl group and hexyl group and examples of the halide include a chloride, bromide and iodide. In addition, as the organic aluminum compound, aluminoxanes can also be utilized which are oligomers to polymers obtained by reacting the above-mentioned organic aluminum with water or water of crystallization.

For the copolymerization, the various highly active catalysts mentioned above can be used, and the obtained copolymer may have any steric structure of isotactic, atactic and syndiotactic structures, or it may be a mixture of the copolymers having these structures.

With regard to a polymerization ratio between the alkenysilane and the olefin, in order to increase the degree of crosslinking, the ratio of the alkenylsilane is usually from about 0.1 to 30 mole %, preferably about 0.5 to 10 mole %. In the present invention, if necessary, the copolymer of the alkenylsilane and the olefin can be mixed with another polyolefin, but in this case, the ratio of the alkenylsilane in the copolymer is from 1 to 20 mole %.

No particular restriction is put on the molecular weight of the polymer, but in order to improve the physical properties of molded articles, it is preferred that the molecular weight is as high as possible, because in the case of the high molecular weight, the crosslinking degree can be increased in spite of a low alkenylsilane content. However, when the molecular weight is excessively high, moldability is poor. Therefore, the preferable molecular weight of the polymer is such that an intrinsic viscosity of the polymer measured in a tetralin solution at 135° C. is from about 0.5 to 10, particularly preferably from about 1.0 to 5.0.

As the copolymer of the alkenylsilane and the olefin in the present invention, a graft copolymer can also be used which can be obtained by graft-polymerizing the alkenylsilane on a polyolefin (e.g., such a polyolefin as mentioned below which may be mixed with the copolymer of the alkenylsilane and the olefin, if necessary). In this case, no particular restriction is put on a method for grafting the alkenylsilane on the polyolefin, and a method and conditions which are used in conventional graft copolymerization can be utilized. In general, the graft copolymerization can be easily carried out by heating the polyolefin and the alkenylsilane in the presence of a radical polymerization initiator such as a peroxide to not less than a decomposition temperature of the radical polymerization initiator. The preferred ratio of the alkenylsilane to be grafted is the same as in the case of the copolymerization of the alkenylsilane and the olefin.

In the present invention, in one embodiment of bringing a composition containing the copolymer of the alkenylsilane and the olefin and a compound having at least two unsaturated bonds into contact with the catalyst, the catalyst which is beforehand impregnated with a polyolefin may be mixed with the above-mentioned composition to achieve the contact of the composition with the catalyst.

As the polyolefin, which is used to be impregnated with the catalyst or with which the copolymer of the alkenylsilane and the olefin is mixed if necessary, there can be exemplified homopolymers of an olefin represented by the above-mentioned formula (2), typical examples of the olefin include α-olefins such as ethylene, propylene, butene-1, pentene-1, hexene-1, 2-methylpentene, heptene-1 and octene-1, styrene and its derivatives; random copolymers of these olefins; and the so-called block copolymers obtained by first homopolymerizing an olefin singly or copolymerizing the olefin with a small amount of another olefin, and then copolymerizing two or more kinds of olefins.

The preparation methods of these polyolefins are already known, and various kinds of products are commercially available.

Furthermore, the polyolefin can also be prepared by the use of the same catalyst and polymerization process as described in detail in the paragraph regarding the above-mentioned preparation of the polymer of the olefin and the alkenylsilane except that the alkenylsilane is not used. Therefore, the obtained polyolefin may have any steric structure of isotactic, atactic and syndiotactic structures, or it may be a mixture of the polymers having these structures.

Examples of the compound having at least two unsaturated bonds which can be used in the present invention include aromatic vinyl compounds such as divinylbenzene, diisopropenylbenzene and diallylbenzene; unsaturated esters such as ethylene glycol dimethacrylate and ethylene glycol diacrylate; and polymers such as polybutadiene and polyisoprene which contain reactive unsaturated bonds In short, as the compound having at least two unsaturated bonds, any compound can be utilized, as long as it has at least two reactive unsaturated bonds. In order to improve the solvent resistance of the crosslinked molded articles to a hydrocarbon compound, particularly in order to obtain the molded articles having a good surface state when treated with the hydrocarbon compound, it is preferable to use a compound having at least two unsaturated bonds and an oxygen atom or a nitrogen atom. Typical examples of the compound having at least two unsaturated bonds and an oxygen atom or a nitrogen atom include ethers, esters, amines, amides, carboxylic acids, alcohols, alkoxysilicons and silicones which have two or more unsaturated bonds, and particularly preferable examples include unsaturated ester such as ethylene glycol dimethacrylate, ethylene glycol diacrylate, polyethylene glycol diacrylate and polyethylene glycol dimethacrylate, polysilicones such as polydimethyl silicondiacrylate and polydimethylsilicon dimethacrylate, diallylamine, diallylbutylamine, diallylamide and hexamethylenediallylamide.

The ratio of the compound having at least two unsaturated bonds to the copolymer of the alkenylsilane and the olefin is usually from 0.01 to 10 parts by weight, preferably from 0.1 to 5 parts by weight based on 100 parts by weight of the copolymer of the alkenylsilane and the olefin. When the ratio is lower than 0.01 part by weight, the effect is insufficient, and when it is higher than 10 parts by weight, the amount of the unreacted unsaturated compound increases unpreferably.

In the present invention, as examples of a catalyst for crosslinking which is brought into contact with a composition containing the copolymer of the alkenylsilane and the olefin and the compound having at least two unsaturated bonds, or molded articles obtained by molding the composition, there are a salt of rhodium (e.g., a triphenylphosphine complex of rhodium chloride); an alkoxy compound of a metal in group IVa of the periodic table which is represented by the formula

$$R^1{}_nM(OR^2)_{4-n} \tag{3}$$

(wherein $R^1$ and $R^2$ may be identical or different, and each of them is a hydrocarbon residue having 1 to 12 carbon atoms; n is an integer of from 0 to 3; and M is a metal selected from the group consisting of titanium, zirconium and hafnium); a metallocene compound of a metal in group IVa (e.g., dicyclopentadienylzirconium dichloride); and a combination of the metallocene compound of a metal in the group IVa and an organic metal compound.

The composition which is used in the present invention can contain an inorganic filler, if necessary. Any inorganic filler can be used, as long as it can be used to improve the physical properties of the polyolefin. Examples of the preferably utilizable organic filler usually include salts, oxides, nitrides and carbides of metals having needle, flake and fiber forms for exerting a large reinforcing effect. Typical utilizable examples are talc, kaolin, mica, calcium carbonate, calcium silicate, calcium sulfate, calcium sulfite and barium titanate. In order to improve the mechanical properties such as stiffness modulus by adding the inorganic filler, the content of the filler in the composition is preferably in the range of from 1 to 60% by weight.

As described above, the composition which is used in the present invention contains the copolymer of the alkenylsilane and the olefin, the compound having at least two unsaturated bonds, and if necessary, the other polyolefin and/or the inorganic filler as constitutional components. No particular restriction is put on a mixing process of these components, and powders of these components may be mixed in a conventional manner and the resultant mixture may be directly utilized. If necessary, the mixture may be melted, kneaded and granulated. According to one embodiment of the present invention, the composition may be molded by injection molding, extrusion or press molding prior to bringing the composition into contact with the catalyst for the crosslinking. An alkenylsilane concentration in the mixture, granules or molded articles is from 0.01 to 20 mole %, preferably from 0.1 to 10 mole %, and such an alkenylsilane concentration permits obtaining the highly crosslinked polyolefin having a high crosslinking point concentration.

In the present invention, the mixture, granules or molded articles are next brought into contact with the catalyst so as to bring about a crosslinking reaction. No particular restriction is put on the contact procedure, but it is a usual manner that the mixture, granules or molded articles are immersed in a solution of the catalyst to be impregnated with the catalyst. In a certain case, the contact of the composition with the catalyst can also be achieved by mixing the above-mentioned constitutional components together with the catalyst, when they are mixed to prepare the composition. Moreover, the contact can also be effected by first preparing a powder of the polyolefin impregnated with the catalyst, and then mixing the catalyst-impregnated polyolefin with the above-mentioned mixture.

The composition of the present invention which has been brought into contact with the catalyst but which has not been molded is then molded by injection molding, extrusion or press molding. Alternatively, the molding may be carried out simultaneously with the contact of the composition with the catalyst by mixing the above-mentioned composition with the catalyst in a molding machine. That is, the composition and the catalyst are heated, melted, mixed and then molded at a temperature of not less than a melting point of the copolymer. In this case, the temperature is in the range of from the melting point of the copolymer to 350° C., preferably from 150° to 300° C. On the other hand, when the molded articles have been immersed in the solution of the catalyst to impregnate the articles with the catalyst, the molded articles taken out from the solution can be heated to accelerate the crosslinking reaction. The contact with the catalyst and the crosslinking reaction are usually carried out in the range of from room temperature to the melting point of the polymer. The contact of the mixture, granules or molded articles with the solution of the catalyst is made preferably in the range of from temperature to 100° C. On the other hand, in the case of one embodiment where the composition is brought into contact with the catalyst in the absence of a solvent, it is conventional to heat the composition to a level of from 50° to 160° C. In any case, after the contact, heating is carried out preferably in the temperature range of from 100° C. to the deformation temperature of the molded articles so as to accelerate the crosslinking reaction.

A solvent which can be used to form the solution of the catalyst is a hydrocarbon compound or a halogenated hydrocarbon compound having 1 to 20 carbon atoms, and above all, a halogenated hydrocarbon compound or an aromatic hydrocarbon compound can be preferably utilized. Typical examples of the solvent include benzene, toluene, xylene, ethylbenzene, dichloromethane, chloroform, dichloroethane, trichloroethane and perchloroethane. In general, the solvent is utilized so that a concentration of the catalyst might be from 0.1 to 10000 ppm.

In the present invention, the amount of the catalyst which is used for the crosslinking is such that a catalyst concentration in the total mixture is from 0.1 to 10000 ppm, preferably from 1 to 5000 ppm, in the case that the composition and the catalyst are heated, melted to be contacted, or such that a catalyst concentration in the solution is from 0.1 to 10000 ppm, preferably from 1 to 1000 ppm, in the case that the composition or the molded articles are immersed in the catalyst solution.

Now, the present invention will be described in more detail in reference to examples.

EXAMPLE 1

A vibration mill equipped with four 4-liter grinding pots, in which 9 kg of steel balls of 12 mm in diameter were present, was used. Under a nitrogen atmosphere, 300 g of magnesium chloride, 60 ml of tetraethoxysilane and 45 ml of α, α,α-trichlorotoluene were placed in each pot, and these materials were then ground for 40 hours. Next, 300 g of the thus ground mixture were placed in a 5-liter flask, and 1.5 liters of titanium tetrachloride and 1.5 liters of toluene were then added thereto. The solution was stirred at 100° C. for 3 minutes, and the resultant supernatant liquid was then removed. Furthermore, 1.5 liters of titanium tetrachloride and 1.5 liters of toluene were added thereto again, and the solution was stirred at 100° C. for 30 minutes, followed by the removal of the supernatant liquid. Afterward, the resultant solid was repeatedly washed with n-hexane to obtain a transition metal catalyst slurry. A part of this slurry was sampled and then analyzed, and as a result, a titanium content was 1.9% by weight.

Under a nitrogen atmosphere, 40 ml of toluene, 100 mg of the above-mentioned transition metal catalyst, 0.128 ml of diethylaluminum chloride, 0.06 ml of methyl p-toluylate and 0.20 ml of triethylaluminum were placed in a 5-liter autoclave, and 1.5 kg of propylene and 80 g of vinylsilane were further added thereto. After 0.5 N liter of hydrogen was introduced thereinto under pressure, polymerization was carried out at 75° C. for 2 hours. After the polymerization, unreacted propylene was purged, and the resultant powder was taken out, filtered, and then dried to obtain 180 g of the powder.

In this example, an intrinsic viscosity (hereinafter abbreviated to "$\eta$") was measured in a tetralin solution at 135° C.; a melting point and a crystallization temperature were measured as maximum peak temperatures by raising or dropping a temperature at 10° C./minute with the aid of a differential thermal analyzer. Thus, the obtained powder was a crystalline propylene/vinylsilane copolymer having $\eta$ of 2.35, a melting point of 156° C. and a crystallization temperature of 120° C. According to elemental analysis, the copolymer contained 1.3% by weight of vinylsilane units.

100 g of the obtained copolymer were mixed with 5 g of divinylbenzene, and the mixture was then press-molded to obtain a molded article having a thickness of 1 mm. This molded article was immersed in a toluene solution in which n-butyl titanate was dissolved so as to be an n-butyl titanate concentration of 10 g/l, so that the molded article was impregnated with the catalyst solution. Afterward, the molded article was taken out from the solution and then heated at 80° C. for 2 hours to accelerate the crosslinking reaction. This molded article was not deformed at all even at 200° C. When the molded article was extracted with boiling xylene for 12 ours, a ratio of an extraction residue was 96%, and a weight increase of the molded article after the extraction was only 10%. Incidentally, the weight increase was determined as follows: After the extraction test, the sample was briefly wiped with a cloth and the like and immediately weighed, and the weight increase was then calculated from the weighed value.

COMPARATIVE EXAMPLE 1

Divinylbenzene was not added to the copolymer obtained in Example 1, and this copolymer was press-molded to obtain a molded article having a thickness of 1 mm. This molded article was immersed in a toluene solution of n-butyl titanate, as in Example 1, and the molded article was heated, crosslinked, and then evaluated, as in Example 1. As a result, the molded article was not deformed even at 200° C. However, when the molded article was extracted with boiling xylene for 12 hours, a ratio of an extraction residue was 92%, and a weight increase of the molded article after the extraction was 95%.

EXAMPLE 2

5 g of divinylbenzene and 30 g of talc (trade name CT-8, made by Asada Seifun Co., Ltd.) were mixed with 100 g of the copolymer obtained in Example 1, and the mixture was then press-molded to obtain a molded article having a thickness of 1 mm. This molded article was immersed in a toluene solution in which n-butyl titanate was dissolved so as to be an n-butyl titanate concentration of 10 g/l, so that the molded article was impregnated with the catalyst solution. Afterward, the molded article was taken out from the solution and then heated at 80° C. for 2 hours to accelerate the crosslinking reaction. This molded article was not deformed at all even at 200° C. When the molded article was extracted with boiling xylene for 12 hours, a ratio of an extraction residue was 98%, and a weight increase of the molded article after the extraction was only 8%. For the molded article, the following physical properties were measured.

| | |
|---|---|
| Stiffness modulus (kg/cm$^2$) | ASTM D747 (23° C.) |
| Tensile strength at yield point (kg/cm$^2$) | ASTM D638 (23° C.) |
| Izod (notched) impact strength (kg·cm/cm$^2$) | ASTM D256 (20° C., −10° C.) |

With regard to the molded article, the stiffness modulus was 21200 kg/cm$^2$; the tensile strength at yield point was 420 kg/cm$^2$; and values of the Izod impact strength (20° C. and −10° C.) were 9 and 2 kg·cm/cm$^2$, respectively.

COMPARATIVE EXAMPLE 2

100 g of the copolymer obtained in Example 1 were mixed with 30 g of talc only, followed by press molding, to obtain a molded article having a thickness of 1 mm. This molded article was immersed in a catalyst solution, heated to accelerate the crosslinking reaction, and then evaluated by the same procedure as in Example 2. The molded article was not deformed even at 200° C. However, when the molded article was extracted with boiling xylene for 12 hours, a ratio of an extraction residue was 94%, and a weight increase of the molded article after the extraction was 95%. In addition, with regard to the physical properties of the molded article, stiffness modulus was 20400 kg/cm$^2$; tensile strength at yield point was 405 kg/cm$^2$; and values of Izod impact strength (20° C. and −10° C.) were 8 and 2 kg·cm/cm$^2$, respectively.

EXAMPLE 3

Polymerization was carried out by the same procedure as in Example 1 except that 80 g of vinylsilane were replaced with 1 g of allylsilane, to prepare a copolymer of propylene and allylsilane which had an allylsilane content of 0.25% by weight. With regard to the thus obtained copolymer, $\eta$ was 1.85; the melting point was 158° C.; the crystallization temperature was 115° C.; and when extraction was made with boiling n-heptane for 6 hours, a ratio of an extraction residue was 96.8%. A molded article was formed by the same procedure as in Example 2 except that 100 g of this copolymer powder were used, and in accordance with the same procedure as in Example 1 except that a triphenylphosphine complex of rhodium chloride was used as a catalyst, this molded article was then immersed in a catalyst solution, heated to accelerate a crosslinking reaction, and then evaluated. With regard to the physical properties of the molded article, stiffness modulus was 19800 kg/cm$^2$; tensile strength at yield point was 390 kg/cm$^2$; and values of Izod impact strength (20° C. and −10° C.) were 11 and 2 kg·cm/cm$^2$, respectively. This molded article was not deformed at all even at 200° C. When the molded article was extracted with boiling xylene for 12 hours, a ratio of an extraction residue was 97%, and a weight increase of the molded article after the extraction was only 10%.

EXAMPLE 4

8 g of polyethylene glycol diacrylate were mixed with 100 g of the copolymer obtained in Example 1, followed by press molding, to obtain a molded article having a thickness of 1 mm. In accordance with the same procedure as in Example 1, this molded article was immersed in a catalyst solution, heated to accelerate a crosslinking reaction, and the evaluated.

The molded article was not deformed at all even at 200° C. When the molded article was extracted with boiling xylene for 12 hours, a ratio of an extraction residue was 98%, and a weight increase of the molded article after the extraction was only 9%. Furthermore, in the molded article which underwent the extraction, no cracks were observed. In this connection, the crosslinked molded article obtained in Example 1 was evaluated in the same manner, and as a result, the molded article after the extraction had many cracks therein.

EXAMPLE 5

A molded article was formed by the same procedure as in Example 4 except that 100 g of the copolymer with allylsilane obtained in Example 3 were substituted for 100 g of the copolymer obtained in Example 1, and in accordance with the same procedure as in Example 1 except that a triphenylphosphine complex of rhodium chloride was substituted as a catalyst for n-butyl titanate, the molded article was immersed in a catalyst solution, heated to accelerate the crosslinking reaction, and the evaluated.

The molded article was not deformed at all even at 200° C. When the molded article was extracted with boiling xylene for 12 hours, a ratio of an extraction residue was 99%, and a weight increase of the molded article after the extraction was only 10% and no cracks were observed.

EXAMPLE 6

100 g of the copolymer obtained in Example 1 were sufficiently mixed with 20 g of talc, 5 g of divinylbenzene and 0.1 g of n-butyl titanate at 25° C., and the mixture was then injection-molded at 250° C. by the use of an injection molding machine made by Ikegai Iron Works, Ltd. The thus molded article was not deformed at all even at 200° C. When the molded article was extracted with boiling xylene for 12 hours, a ratio of an extraction residue was 96%, and a weight increase of the molded article after the extraction was 24%. Furthermore, this molded article was heated at 140° C. for 1 hour and then extracted with boiling xylene for 12 hours, and as a result, a ratio of an extraction residue was 99%, and a weight increase of the molded article after the extraction was only 6%. With regard to the physical properties of the molded article before the heating treatment, stiffness modulus was 20800 kg/cm$^2$; tensile strength at yield point was 405 kg/cm$^2$; and values of the Izod impact strength (20° C. and −10° C.) were 10 and 3 kg·cm/cm$^2$, respectively. After the heating treatment, the stiffness modulus was 21500 kg/cm$^2$; tensile strength at yield point was 430 kg/cm$^2$; and values of the Izod impact strength (20° C. and −10° C.) were 14 and 3 kg·cm/cm$^2$, respectively.

COMPARATIVE EXAMPLE 3

In accordance with the same procedure as in Example 1 except that 100 g of a copolymer of propylene and vinylsilane were replaced with 100 g of a homopolymer of propylene (trade name Noblen JHH-G, made by Mitsui Toatsu Chemicals, Inc.), press molding was carried out, and a molded article was immersed in a catalyst solution, heated to accelerate a crosslinking reaction, and then evaluated. When this molded article was extracted with boiling xylene, a ratio of an extraction residue was only 12%.

COMPARATIVE EXAMPLE 4

In accordance with the same procedure as in Example 2 except that 100 g of a copolymer of propylene and vinylsilane were replaced with 100 g of a homopolymer of propylene (trade name Noblen JHH-G, made by Mitsui Toatsu Chemicals, Inc.), press molding was carried out, and a molded article was immersed in a catalyst solution, heated to accelerate a crosslinking reaction, and then evaluated. When this molded article was extracted with boiling xylene, a ratio of an extraction residue was only 38%. With regard to the physical properties of the molded article, stiffness modulus was 19200 kg/cm$^2$; tensile strength at yield point was 385 kg/cm$^2$; and the Izod impact strength (20° C. and −10° C.) was 7.5 and 1.8 kg·cm/cm$^2$, respectively.

What is claimed is:

1. A method for preparing a molded article of a crosslinked polyolefin which comprises the steps of bringing a composition comprising a copolymer of an alkenysilane and an olefin and a compound having at least two unsaturated bonds selected from the group consisting of an aromatic vinyl compound, a polymer which contains reactive unsaturated bonds, and an ether, an ester, an amine, an amide, a carboxylic acid, an alcohol an alkoxysilicon and a silicone which has two or more unsaturated bonds into contact with a catalyst selected from the group consisting of salts of rhodium, alkoxy compounds and metallocene compounds of metals in the group IVa of the periodic table, combinations of the metallocene compounds and organic aluminum compounds, and then molding the composition, or carrying out the contact simultaneously with the molding, or molding the composition, and then bringing the molded article into contact with the catalyst, and if necessary, further heating the molded article to accelerate a crosslinking reaction.

2. The method according to claim 1 wherein said composition further contains an inorganic filler.

3. The method according to claim 2 wherein said compound having at least two unsaturated bonds is a compound having an oxygen atom or nitrogen atom.

4. The method according to claim 2 wherein said compound having at least two unsaturated bonds is a compound selected from the group consisting of ethers, esters, amines, amides, carboxylic acids, alcohols, alkoxysilicons and silicones, which have two or more unsaturated bonds.

5. The method according to claim 1 wherein a heating temperature for accelerating said crosslinking reaction is in the range of from 100° C. to a deformation temperature of said molded article.

6. A molded article of a crosslinked polyolefin prepared in accordance with the method described in claim 1.

7. The method according to claim 1 wherein said compound having at least two unsaturated bonds is a compound having an oxygen atom or nitrogen atom.

8. The method according to claim 1 wherein said compound having at least two unsaturated bonds is a compound selected from the group consisting of ethers, esters, amines, amides, carboxylic acids, alcohols, alkoxysilicons and silicones, which have two or more unsaturated bonds.

9. The method according to claim 1 wherein the copolymer is a copolymer of an alkenylsilane selected from the group consisting of vinylsilane and allylsilane and propylene.

10. The method according to claim 9 wherein the alkenylsilane is vinylsilane.

11. The method according to claim 9 wherein the alkenylsilane is allylsilane.

12. The method according to claim 1 wherein the compound having at least two unsaturated bonds is an aromatic vinyl compound.

13. The method according to claim 12 wherein the aromatic vinyl compound is divinylbenzene.

14. The method according to claim 1 wherein the catalyst is an alkoxy compound of a metal in group IVa of the periodic table.

15. The method according to claim 14 wherein the catalyst in an alkoxide of titanium.

16. The method according to claim 15 wherein the catalyst is n-butyl titanate.

* * * * *

UNITED STATES PATENT AND TRADEMARK OFFICE
CERTIFICATE OF CORRECTION

PATENT NO. : 5,314,957
DATED : May 24, 1994
INVENTOR(S) : Asanuma et al.

It is certified that error appears in the above-identified patent and that said Letters Patent is hereby corrected as shown below:

Claim 1, column 10, line 40, "alkenysi-" should be -- alkenylsi- --;

column 10, line 45, after "alcohol" insert a comma (--,--).

Signed and Sealed this

Eighth Day of November, 1994

Attest:

BRUCE LEHMAN

*Attesting Officer*    *Commissioner of Patents and Trademarks*